United States Patent
Sari et al.

(10) Patent No.: US 7,068,163 B2
(45) Date of Patent: Jun. 27, 2006

(54) METHOD AND APPARATUS FOR IDENTIFYING WAYPOINTS USING A HANDHELD LOCATOR DEVICE

(76) Inventors: Philip D. Sari, 444 Valley View Dr., Kelso, WA (US) 98626; Mark Kuning, 231 John St., Kelso, WA (US) 98626; Lester D. Hutter, 2721 Taylor Ave., Longview, WA (US) 98632; Adam Hamer, 2967 Laurel Rd., Longview, WA (US) 98632

(*) Notice: Subject to any disclaimer, the term of this patent is extended or adjusted under 35 U.S.C. 154(b) by 105 days.

(21) Appl. No.: 10/794,075

(22) Filed: Mar. 3, 2004

(65) Prior Publication Data
US 2004/0178908 A1    Sep. 16, 2004

Related U.S. Application Data

(63) Continuation-in-part of application No. 09/908,219, filed on Jul. 17, 2001, now Pat. No. 6,791,477.

(51) Int. Cl.
*G08B 1/08*    (2006.01)
*H04Q 7/00*    (2006.01)

(52) U.S. Cl. ............ 340/539.13; 340/995; 340/825.36; 342/357.01

(58) Field of Classification Search .......... 340/539.13, 340/995, 988, 989, 990, 825.36, 825.49; 342/357.01, 357.07, 357.08, 357.09
See application file for complete search history.

(56) References Cited

U.S. PATENT DOCUMENTS

| 5,270,936 A | 12/1993 | Fukushima et al. ......... 364/444 |
| 5,838,237 A | 11/1998 | Revell et al. ............... 340/573 |
| 6,363,324 B1 | 3/2002 | Hildebrant .................. 701/213 |
| 6,392,592 B1 | 5/2002 | Johnson et al. ............. 342/357 |
| 6,407,698 B1 | 6/2002 | Ayed ..................... 342/357.07 |
| 6,489,921 B1 | 12/2002 | Wilkinson ............. 342/357.08 |
| 6,529,142 B1 | 3/2003 | Yeh et al. ................... 340/988 |
| 6,791,477 B1 * | 9/2004 | Sari et al. .............. 340/825.36 |

* cited by examiner

*Primary Examiner*—John Tweel, Jr.
(74) *Attorney, Agent, or Firm*—Marger Johnson & McCollom, P.C.

(57) ABSTRACT

A locator device includes a pocket-sized casing that contains a keyless remote entry circuit for remotely operating a vehicle security system. A GPS receiver circuit is located in the casing and automatically identifies a vehicle waypoint whenever the vehicle is turned off. The locator device then determines from any current location and with a single button press the direction and/or distance back to the vehicle waypoint. Many other novel applications are also performed by the locator device.

20 Claims, 11 Drawing Sheets

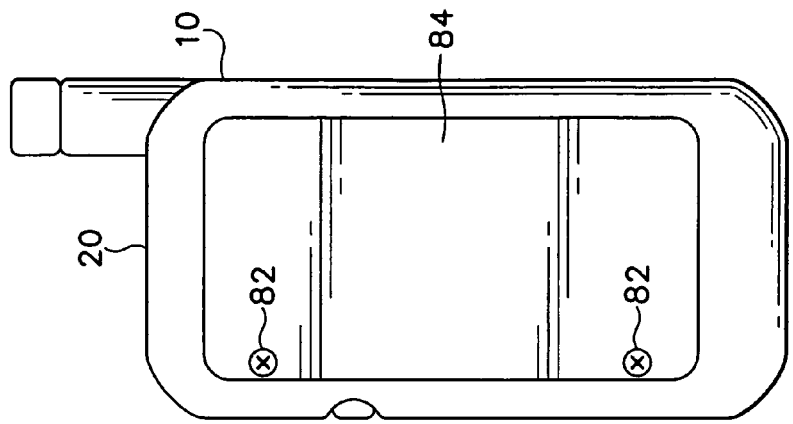
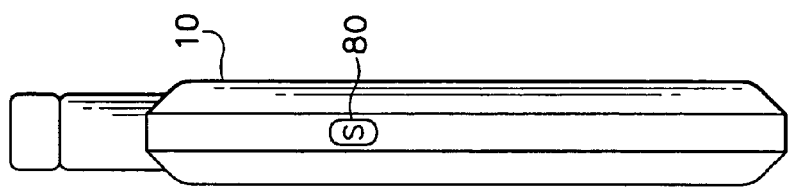
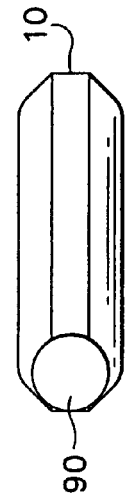
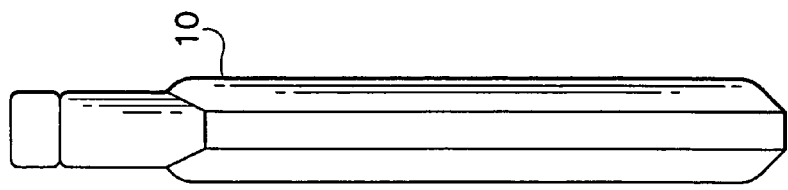
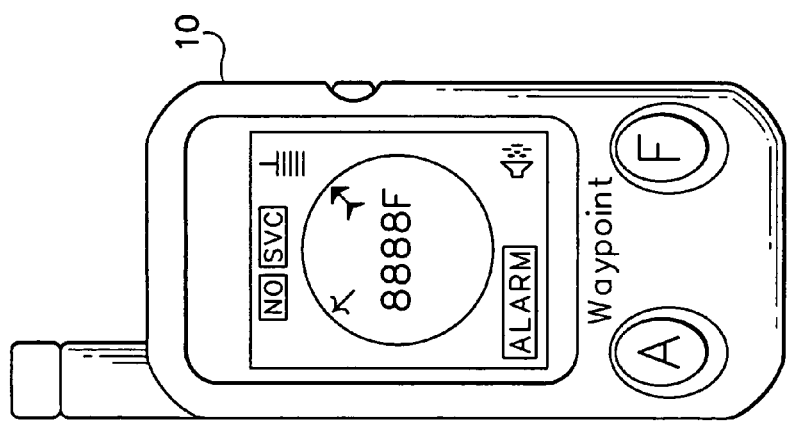
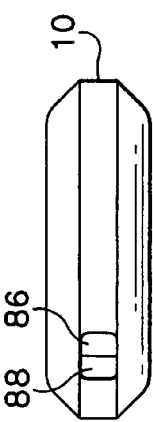

METHOD AND APPARATUS FOR IDENTIFYING WAYPOINTS USING A HANDHELD LOCATOR DEVICE

CROSS REFERENCE TO RELATED APPLICATIONS

This application is a Continuation-in-Part and claims priority from copending U.S. patent application Ser. No. 09/908,219, filed Jul. 17, 2001 now U.S. Pat. No. 6,791,477.

BACKGROUND OF THE INVENTION

Vehicle owners may park in large shopping center parking lots. The vehicle owner may forget where their vehicle is parked after hours of shopping. Travelers in unfamiliar cities also can easily forget their way back to their hotels or their parked cars. People can also get lost while hiking and have difficulty finding where their vehicle is parked at a trailhead. People may also be abducted, attacked, or otherwise prevented from notifying others of their whereabouts.

Most handheld Global Positioning System (GPS) devices provide direction and distance information to a pre-determined starting point (waypoint) and display this information on a display screen. However, the GPS operator may forget to set the waypoint before heading out on a journey preventing the GPS system from identifying the original waypoint for their parked car. This is especially true then someone is frequently getting in and out of their car, for example, when driving in the city. In other situations, the operator of a handheld GPS device will typically not use it at all where the surroundings are familiar.

The GPS devices are also cumbersome and require the GPS operator to continuously carry the GPS device wherever the GPS operator is walking. Current GPS devices are also complicated to use and require the GPS operator to input numerous settings and wade through numerous menus and pushbutton operations before getting to the desired GPS information. This all prevents current GPS systems from being used effectively for city driving and in many other activities.

SUMMARY OF THE INVENTION

A locator device includes a pocket-sized casing. A GPS receiver circuit is located in the casing and automatically identifies a waypoint whenever a triggering event occurs. The locator device then determines from any current location and with a single button press the direction and/or distance back to the waypoint. Many other novel applications are also performed by the locator device.

BRIEF DESCRIPTION OF THE DRAWINGS

FIGS. 5A–5G are different views of the locator device shown in FIG. 1.

DETAILED DESCRIPTION OF THE INVENTION

Figure 1:
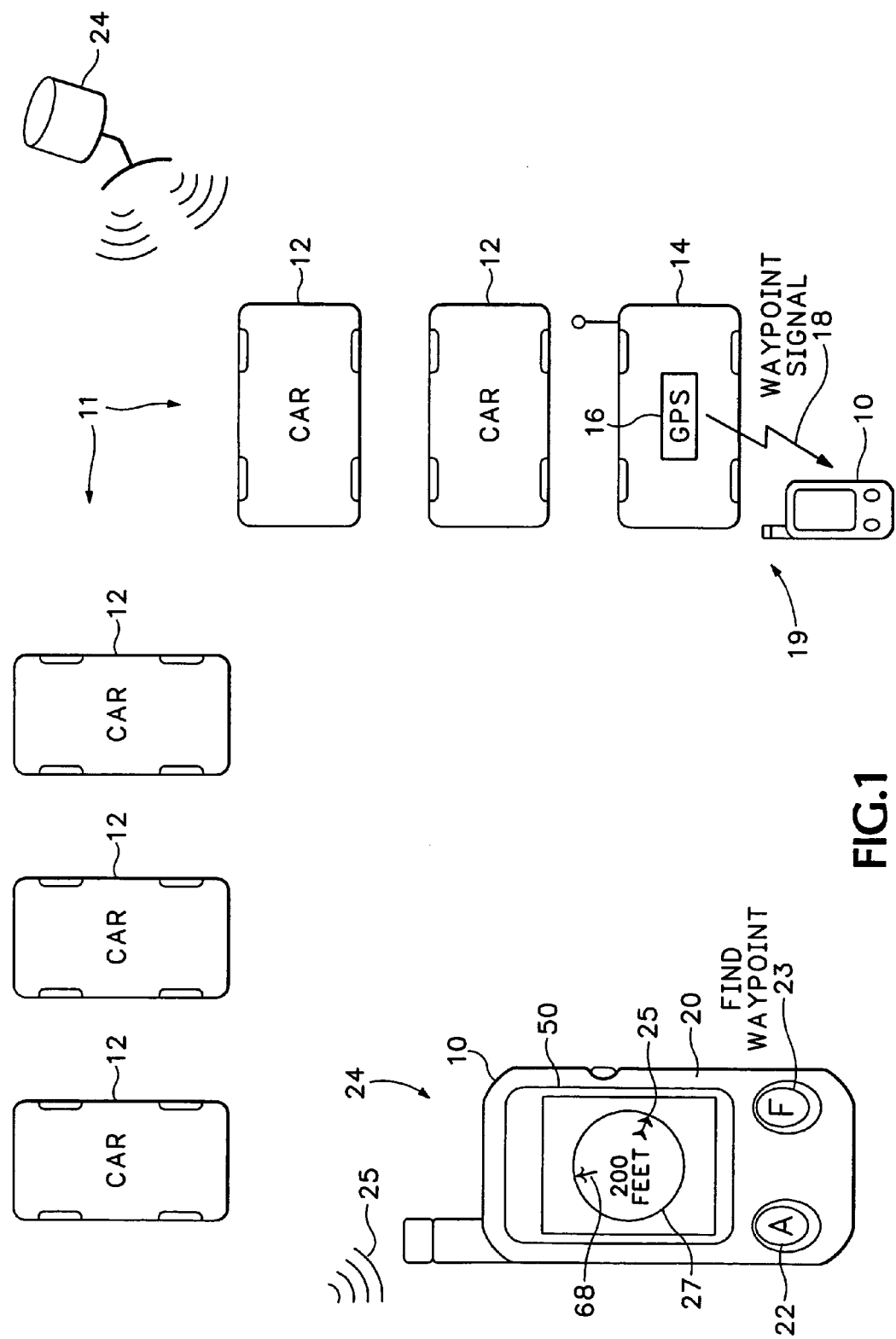
FIG. 1 is a diagram of a locator device used to determine a direction and distance back to a waypoint.
Figure 2:
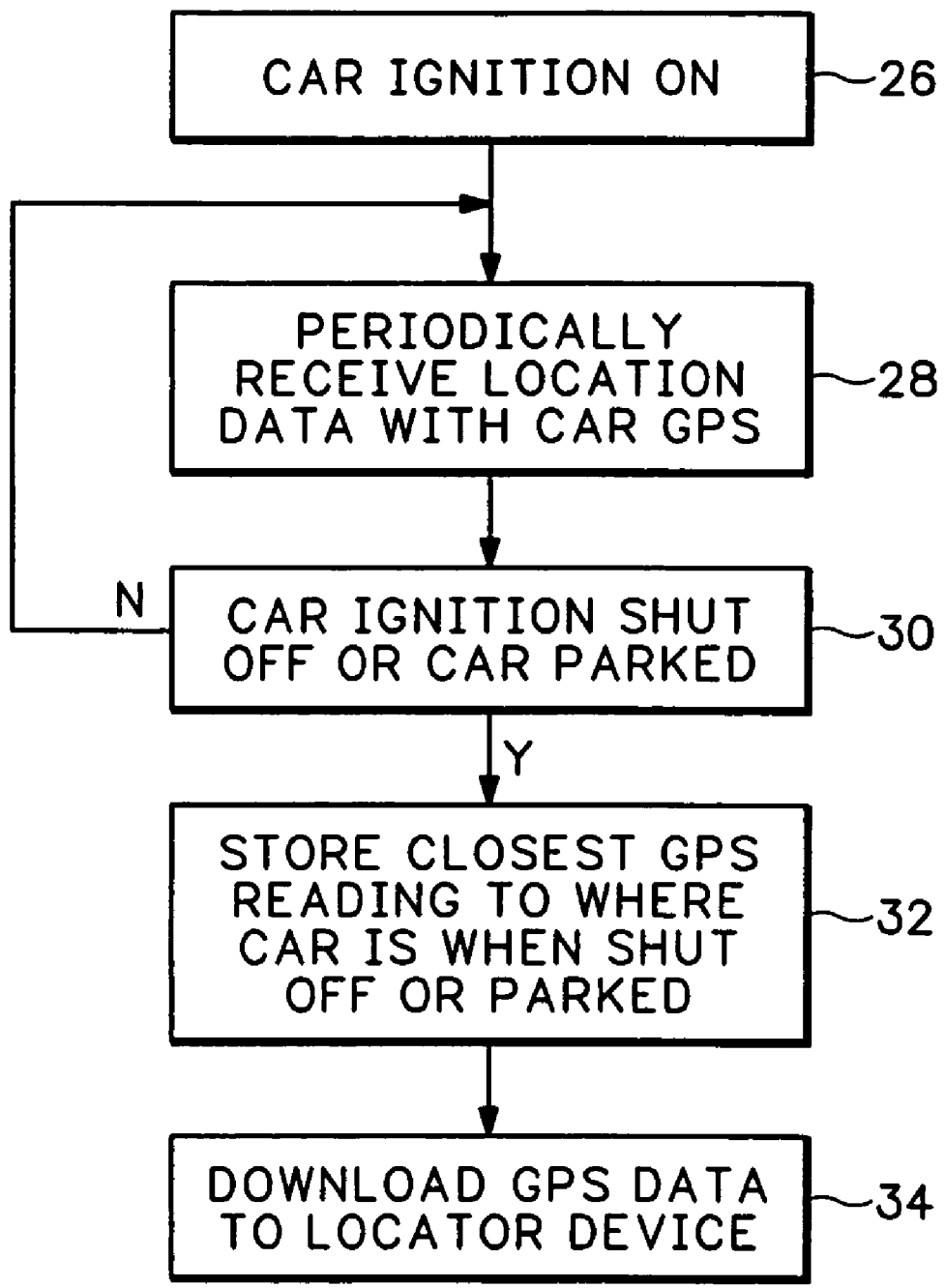
FIG. 2 is a flow diagram showing how a GPS system in a vehicle automatically downloads GPS readings to the locator device shown in FIG. 1.

FIGS. 1 and 2 show one example of how a locator device 10 is used to locate a waypoint. The general appearance of the locator device 10 is similar to currently available keyless entry remote controls used in the vehicle alarm industry. For example, the locator device 10 can be located inside a wireless remote entry 'key faub' that is about 1–1½ inches wide and around 2–2½ inches high. The locator device 10 includes a GPS circuit also located inside casing 20. A direction arrow on a Liquid Crystal Display (LCD) 50 points back to the pre-determined waypoint. The locator device 10 also includes a Radio Frequency (RF) modem located inside casing 20 that provides bi-directional data transfer between other devices.

The general population is familiar and/or use key tabs to remotely activate vehicle alarms and keyless vehicle entry systems. By incorporating the locator device 10 with a key faub, an additional remote wireless GPS device does not have to be separately carried by an operator. A waypoint is automatically downloaded into the locator device 10 when a car 14 is parked. This prevents an operator from having to remember to set a waypoint when leaving a parked car. The locator device 10 can also manually determine new waypoints by pressing a single button. The operator can determine a direction and distance back to any entered waypoint with one button press. This eliminates the complexity of present GPS systems.

The RF 22 can receive waypoint information from another device, transmit internally stored waypoint data to another device and operate a vehicle alarm system, keyless entry system or other access control device.

A digital compass 68 provides a current bearing while the mobile device 10 is stationary. The compass 68 lets the locator device 10 be still while determining the correct direction and distance to the pre-stored waypoint. The display 50 also indicates other operational status information and security information relevant to keyless entry and internal battery strength.

In the example shown in FIG. 1, the locator device 10 identifies the direction back to vehicle 14 in parking lot 11. There are multiple cars 12 parked in parking lot 11. The vehicle 14 includes a GPS system 16 that receives GPS data from one or more GPS satellites 24. When the ignition in vehicle 14 is turned on in block 26 (FIG. 2), the GPS system 16 in block 28 periodically reads GPS signals from the GPS satellite 24. The GPS system 16 is continuously updated with the latest GPS data until the vehicle is shutoff or parked in block 30. The GPS system 16 stores the GPS data reading that most closely locates the position where the vehicle is parked. In one example, the last GPS reading before the vehicle is turned off is used. In another example, the GPS reading is taken when the vehicle is parked.

The GPS reading at the vehicle shutoff or parked location is stored by the vehicle GPS system 16 in block 32. The vehicle GPS system 16 then automatically downloads this GPS data at location 19 via a wire or wireless signal 18 to the locator device 10 in block 34. The locator device 10 saves the GPS data as a waypoint. The locator device 10 is then taken from the vehicle 14 and carried by the vehicle operator or passenger.

Because the position signal 18 is automatically downloaded to the locator device 10 whenever the vehicle 14 is turned off or parked, the operator of locator device 10 will not inadvertently forget to establish the waypoint before leaving vehicle 14. And because the locator device 10 is located inside the same key faub casing 20 that operates the wireless vehicle entry system, the vehicle operator will not likely forget the locator device 10 when exiting vehicle 14.

The operator moves the locator device 10 to some other location, such as position 24. To identify the location back to the car 14 (waypoint 19), the operator presses button 23. The locator device 20 receives a GPS signal 25 from one or more GPS satellites 24 and calculates a current position. The locator device 20 then calculates a direction and distance back to the waypoint 19 and displays the direction using arrow 25 and displays the distance as numeric characters 27.

It is important to note that only a single key press of key 23 is required for the operator to identify the direction and distance back to waypoint 19. This one key press operation allows easier operation then existing GPS systems.

Figure 3:
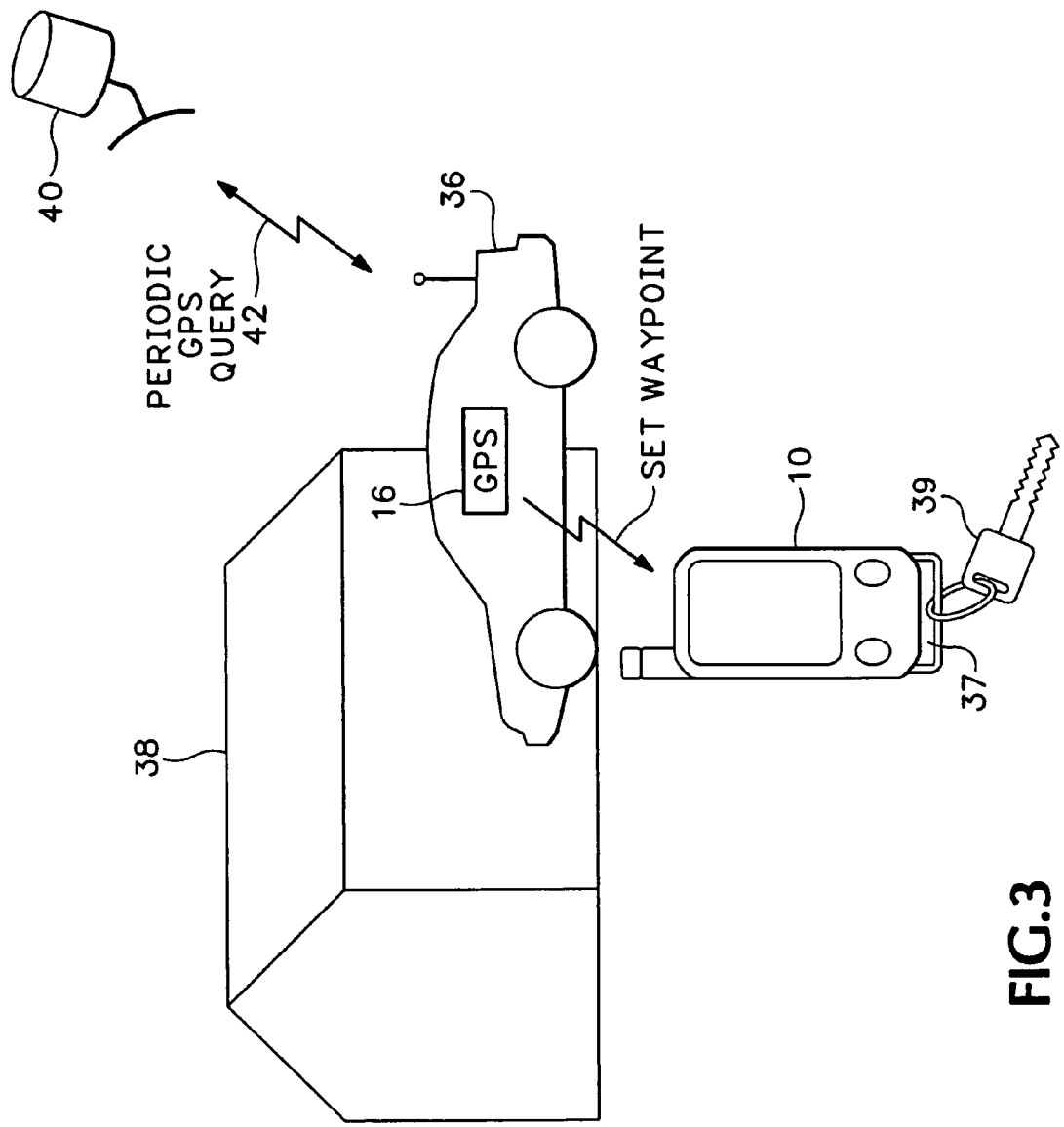
FIG. 3 is a diagram showing how the locator device is used to identify the location back to a last GPS reading taken in the vehicle GPS system.
Figure 3:
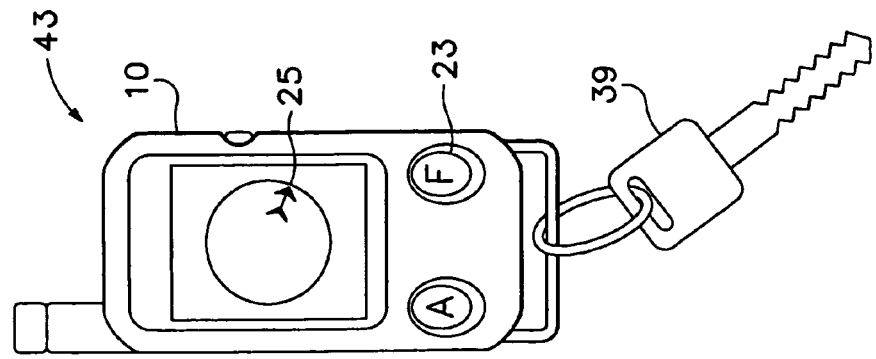

FIG. 3 shows an example of how the locator device 10 operates when a GPS signal is not detectable at the time the vehicle 36 is shutoff or parked. In some situations, the vehicle 36 containing the GPS system 16 may not be able to receive a GPS signal 42 at the time the vehicle is shutoff or parked. For example, the vehicle 36 may be driven into a parking garage 38. The last time the vehicle 36 receives GPS signal 42 is just before entering parking garage 38.

To prevent the vehicle GPS system 16 from downloading a null GPS reading to the locator device 10, the GPS system 16 periodically reads the GPS signals 42 from one of the GPS satellites 40. In one example, the GPS system 16 reads the GPS signals 42 once every second. The last "successful" GPS reading prior to the vehicle 36 being shutoff or parked is stored in the GPS system 16. This last successful reading is then automatically downloaded to the locator device 10 after the vehicle 36 is shutoff or parked.

The locator device 10 is moved to a different location 43. When the 'F' button 23 is pressed, a GPS receiver in the locator device 10 reads GPS position data from GPS satellite 40 to identify a current position. The locator device 10 then uses the current GPS position and stored GPS waypoint to identify the direction and distance back to vehicle 36. While the direction and distance may not point exactly to where the vehicle 36 was parked, the direction and distance do identify where the vehicle 36 entered the parking garage 38. This will normally be in range of the remote entry system in the locator device 10 that can then activate a horn in vehicle 36. The operator can then use the horn to audibly find vehicle 36. Of course, if the GPS signals 42 are successfully detected inside the parking garage 38, the waypoint will coincide with the parked location of vehicle 36. The locator device 10 shown in FIG. 3 also includes a slot 37 for holding a key 39. In one embodiment, the GPS data from GPS 16 is downloaded over the RF modem that also controls the vehicle security system.

Figure 4:
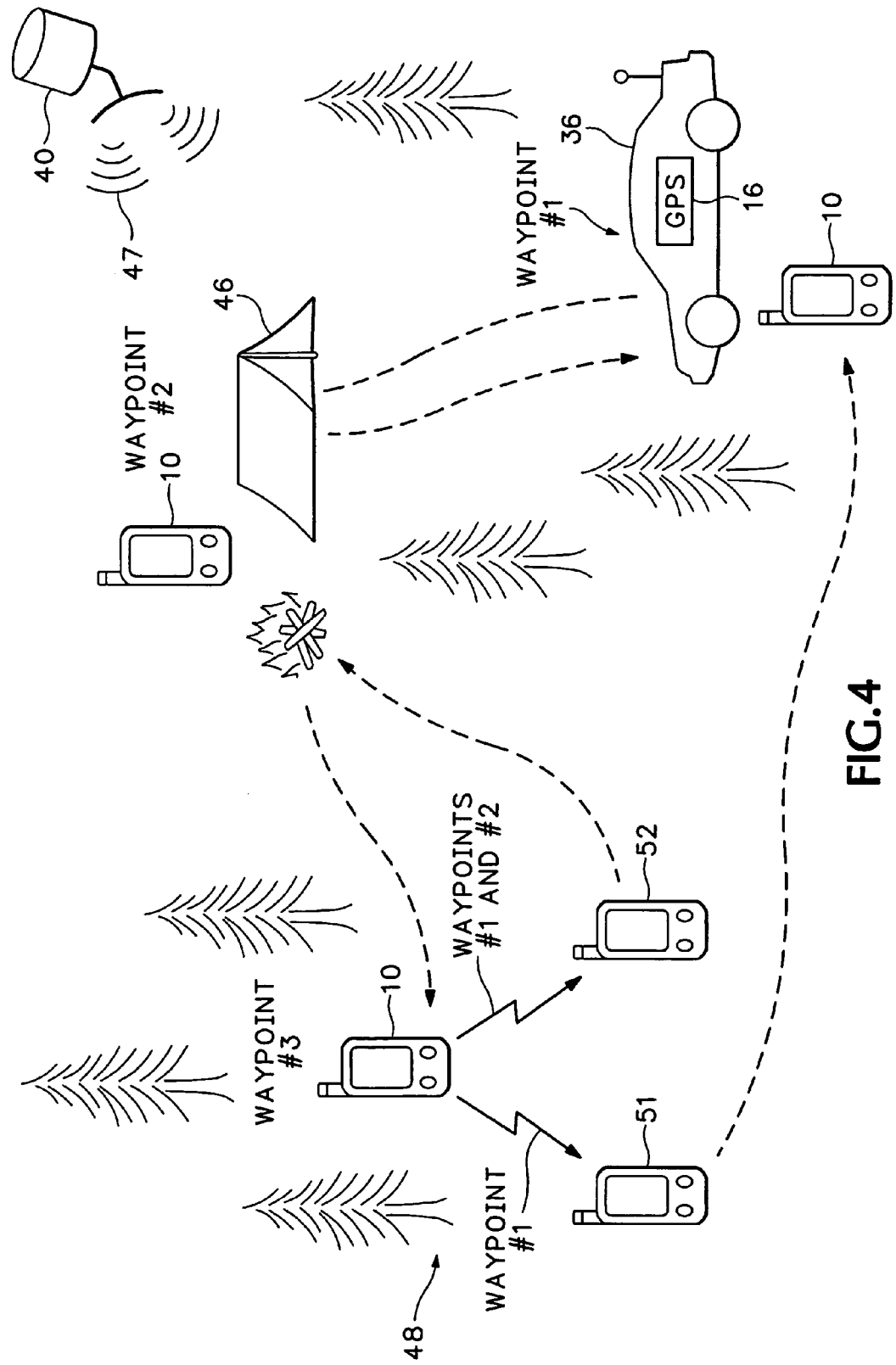
FIG. 4 is a diagram showing how multiple waypoints are used by the locator device shown in FIG. 1.

FIG. 4 shows how the locator device 10 can store multiple waypoints and download the multiple waypoints to one or more other locator devices. A vehicle 36 is parked at a waypoint #1. The GPS system 16 in vehicle 36 automatically downloads a first waypoint #1 to locator device 10. The operator of locator device 10 then hikes to a campsite 46. The operator sets a second waypoint #2 at the campsite 46. This is done by the operator manually pressing a menu option that directs the locator device 10 to read a GPS signal 47 from one or more available GPS satellites 40. A position is derived from the GPS signals 47 and stored in the locator device 10 as waypoint #2.

The operator of locator device 10 later hikes to a third location 48. Two other hikers carry locator devices 51 and 52. The operator of locator device 10 selects the menu options for reading the GPS signals 47 for location 48. The locator device 10 reads the GPS signals and calculates the position and stores it as waypoint #3.

The operator of locator device 51 wishes to travel from location 48 directly back to the vehicle at waypoint #1. The wireless modem in locator device 10 is directed to transmit the waypoint #1 information to locator device 51. The locator device 51 also reads the GPS signals 47 from the GPS satellite 40 to calculate a current position at location 48. The locator device 51 then calculates the direction and distance back to waypoint #1 and the operator of locator device 51 begins hiking back to vehicle 36.

The operator of locator device 52 wishes to hike to campsite 46 and then to the vehicle 36. The operator of locator device 52 may have never been to campsite 46 or to vehicle 36 or may have not set waypoints while at either location. The position data for waypoints #1 and #2 is downloaded from locator device 10 to locator device 52. The locator device 52 then reads the GPS signals at current location 48 and calculates the direction and distance back to campsite 46. Alternatively, locator device 52 also receives current location 48 from location device 10. When at campsite 46, the locator device 52 then calculates the direction and distance to vehicle 36 using waypoint #1 received from locator device 10.

The examples above locate a vehicle or campsite. However, it should be understood that the locator device 10 can be used to identify any location back to any waypoint. It is also possible for the locator device 10 to manually read the GPS data at the location of vehicle 36 directly from the GPS satellite 40. This may be necessary if the vehicle GPS system 16 is non-operational or does not exist.

Figure 5A:
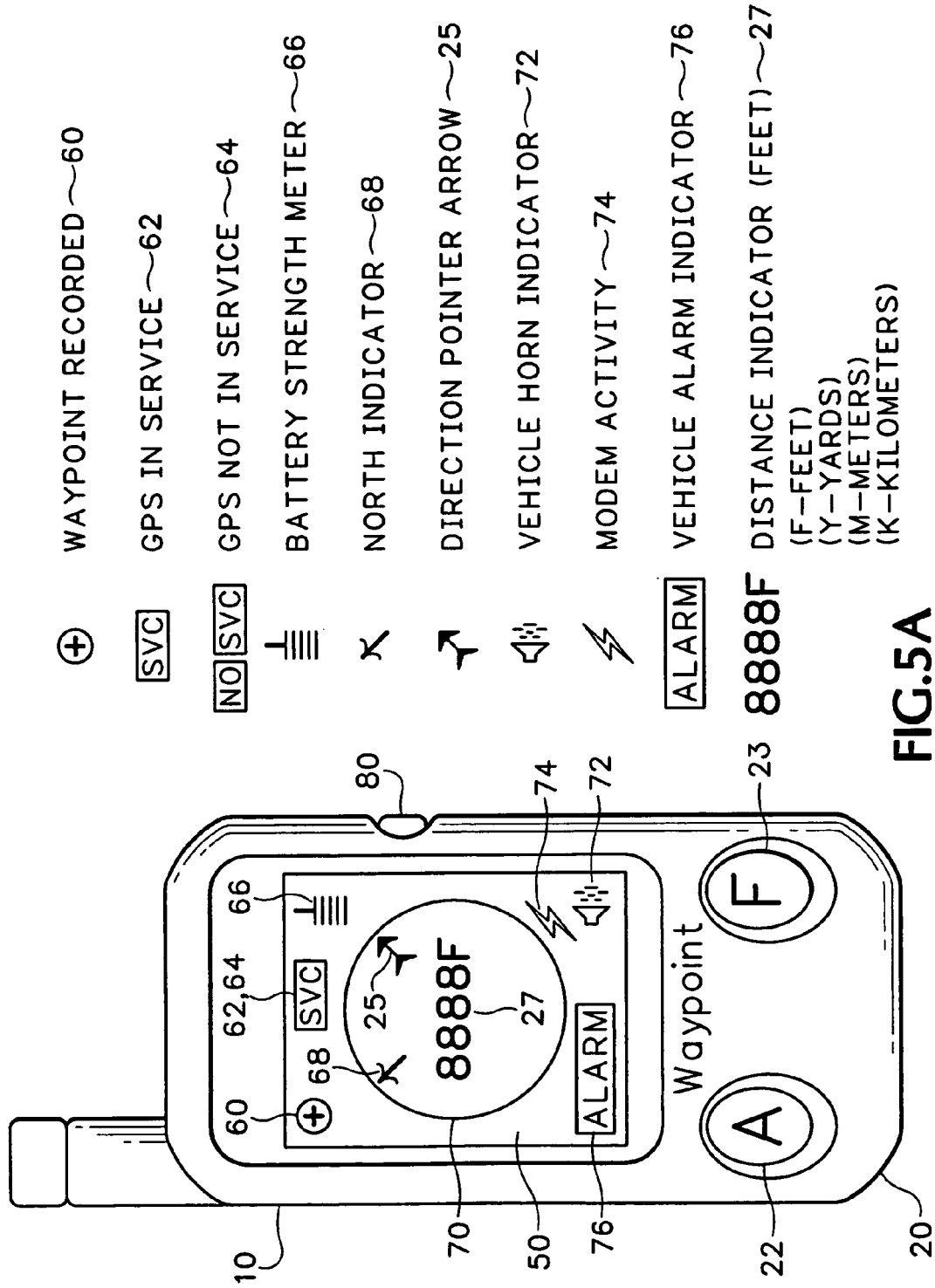

FIG. 5A explains in further detail the functions performed by the locator device 10. The 'A' button 22 is used to activate or disable a vehicle alarm or lock or unlock a vehicle keyless entry system. The 'A' Button also provides sub-functions for a user set up menu described below. The 'F' button 23 is used to activate the 'Find waypoint' function that activates the internal GPS receiver to take a GPS reading, determine a current position, and calculate a direction and distance to a selected waypoint. The 'F' button also selects additional sub-functions in the user set up menu.

The screen 50 in one embodiment is a color, Liquid Crystal Display (LCD) panel assembly with backlight and piezo enunciator. A waypoint recorded icon 60 indicates a waypoint has been recorded. A GPS In Service icon 62 is displayed when a GPS signal can be read by the locator device 10 and a GPS Not In Service icon 64 is displayed when the GPS signal can not currently be read by the locator device 10. A Battery Strength Meter icon 66 identifies the amount of charge for a battery in the locator device 10.

A North Indicator icon 68 is displayed by an internal electronic compass to identify the direction of magnetic north. A Direction Pointer Arrow icon 25 identifies the direction from a current GPS location to a selected waypoint and displays a compass rose 70 with multiple point positions.

A Vehicle Horn Indicator icon 72 indicates that the vehicle has responded to a request by the user (button 'A') to turn off the vehicle alarm and honk the horn. A Modem Activity icon 74 indicates when an internal modem is transmitting or receiving data with another device. A Vehicle Alarm Indicator icon 76 is displayed when a vehicle alarm has been set by the keyless entry circuitry in the vehicle. An alphanumeric display 27 indicates a distance from a derived current location to a selected waypoint. The alphanumeric display 27 can be configured during a setup mode to display distance in increments of feet, yards, meters or kilometers. The alphanumeric display 27 is also used in a setup mode to show menu and submenu names.

FIG. 5B is another front view of the locator device 10 and FIG. 5C is a left side view of the locator device 10. FIG. 5D is a right side view showing a 'S' button 80 used to activate the GPS receiver to take a GPS reading and store derived positional data as a waypoint. FIG. 5E is a back view of locator device 10 that shows retaining screws 82 used to attach a rear door 84 to the case 20. The rear door 84 includes tabs (not shown) on the end opposite to the screws 82 that fit into recessed areas in the case 20. FIG. 5F is a bottom view that shows a recessed lanyard 86 with a stainless steel wrist pin 88 for attaching to a key ring. FIG. 5G is a top view showing a top end of an antenna 90.

Figure 6C:
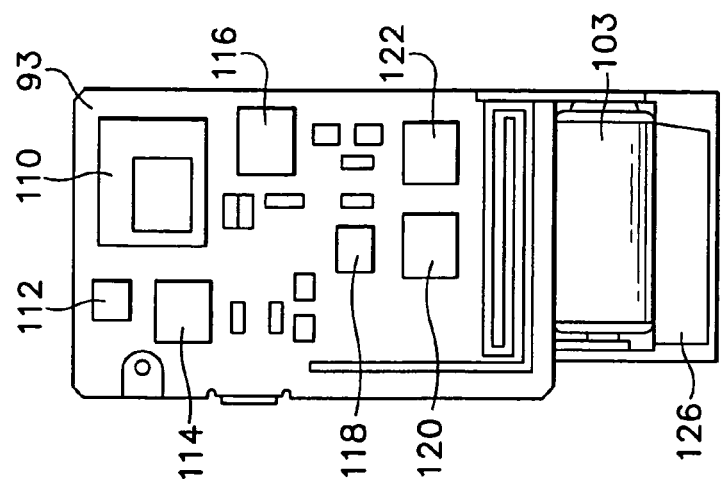
FIGS. 6A–6C are different views of the circuitry inside the locator device.
Figure 6B:
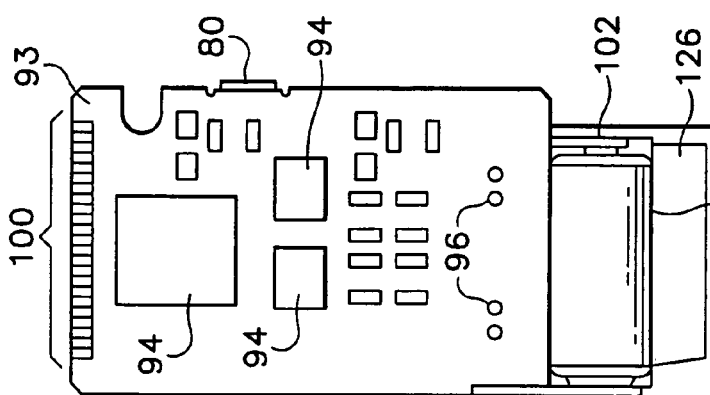
Figure 6A:
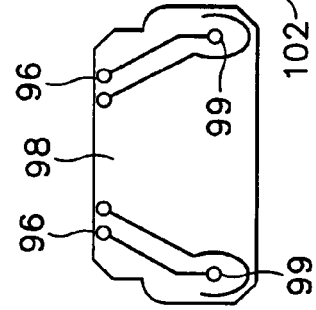
Figure 6A:
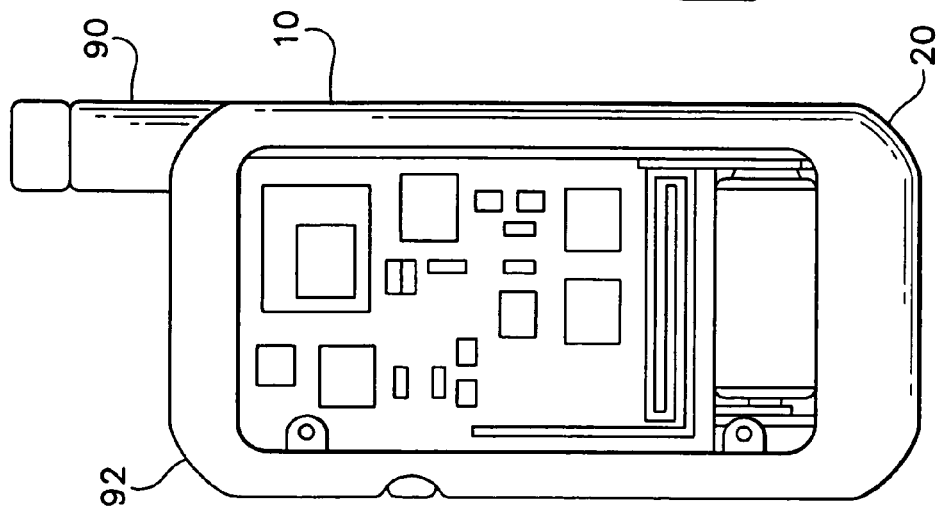

FIG. 6A is a back view of the locator device 10 with the rear access door removed. The case 20 includes front and back pieces of plastic glued around the edges to maintain a water resilient seal. The RF antenna 90 is an integrated GPS active patch antenna with a molded rubber coating finish. Silicon rubber O-ring seals 92 are used between the rear access door 84 (FIG. 5E) and casing 20 and between the LCD display screen 50 (FIG. 5A) and the front piece of casing 20.

FIG. 6B is a front view of a main circuit board 93. The multi-layered glass epoxy circuit board 93 connects all the various surface mount components and provides interlayer shielding. A Global Positioning System (GPS) receiver 94 and an EEPROM are mounted on the front side of the main circuit board 93 for running the operating system software. Contacts 96 are used for connecting a front panel circuit board 98 to the main circuit board 93. The front panel circuit board 98 is a double-sided glass epoxy circuit board and detects the push buttons 22 and 23 (FIG. 5A) through resistance type tactile contacts 99. Battery contacts 102 connect to an internal battery 103. The battery 103 is a rechargeable lithium-ion battery. An inductive pickup and battery charging module 126 recharges battery 103. The 'S' button 80 is a mechanical tactile switch assembly. Circuit board contacts 100 provide connection to a Flex Circuit that is coupled to the LCD display 50 shown in FIG. 5A.

FIG. 6C is a rear view of the main circuit board 93. A display driver 110 controls the display 50. A non-volatile memory IC 112 provides temporary storage of positioning data. An electronic compass processor 114 provides electronic compass readings. A Central Processing Unit (CPU) 116 processes GPS and electronic compass information to generate direction and distance information. The CPU 116 also processes data received from another RF modem in a vehicle that provides keyless remote entry status.

A Voltage Controlled Oscillator (VCO) 118 generates radio frequencies in the 300 MHz range. A transceiver 120 generates encoded transmit data and decodes received data. A Radio Frequency (RF) modem IC 122 transmits encrypted control data to a vehicle for processing as vehicle keyless entry and alarm functions. The RF modem 122 also receives vehicle status data and waypoint positional data from outside sources for forwarding to the CPU 116.

Figure 7A:
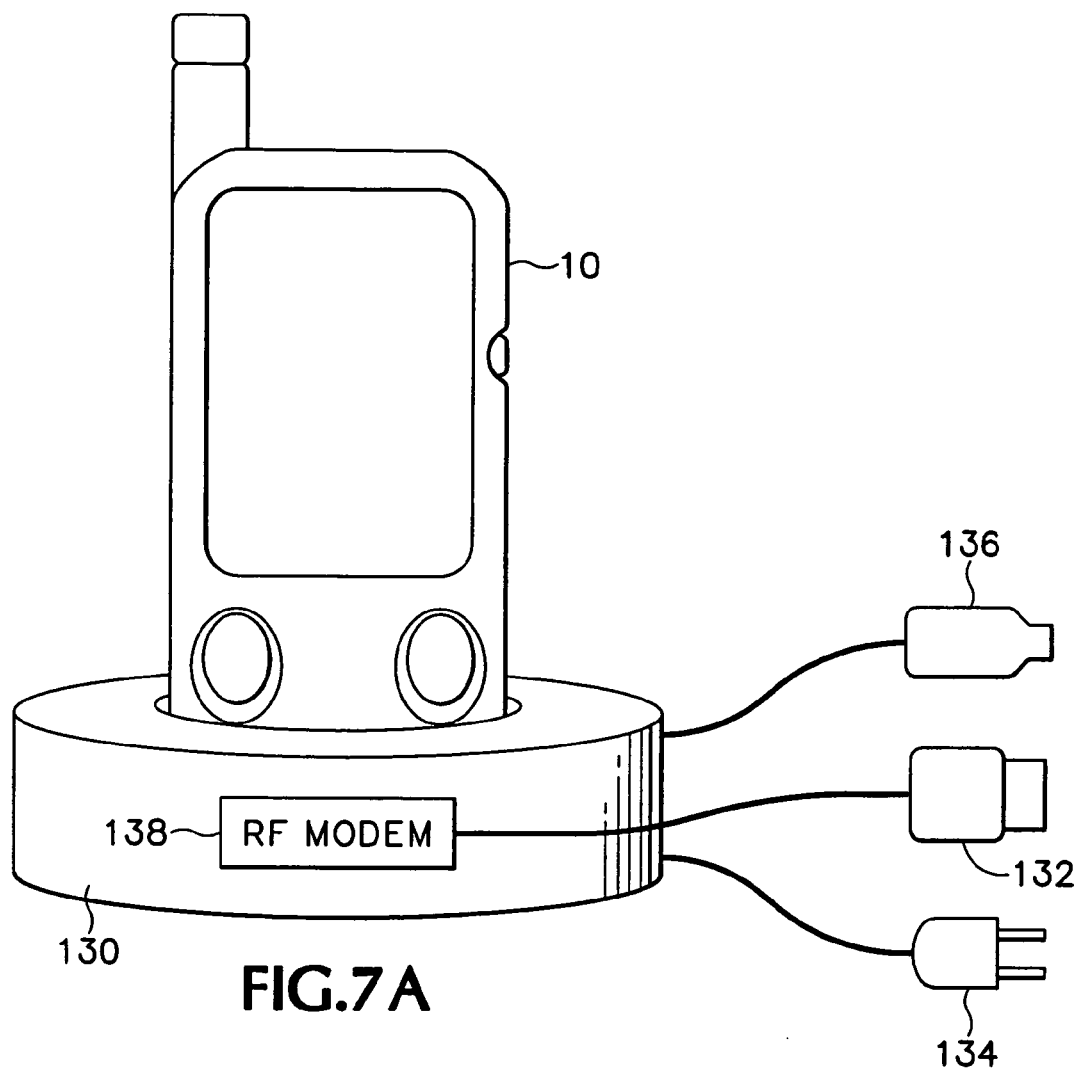
FIGS. 7A–7B are diagrams showing a charging system used for recharging a battery in the locator device.
Figure 7B:
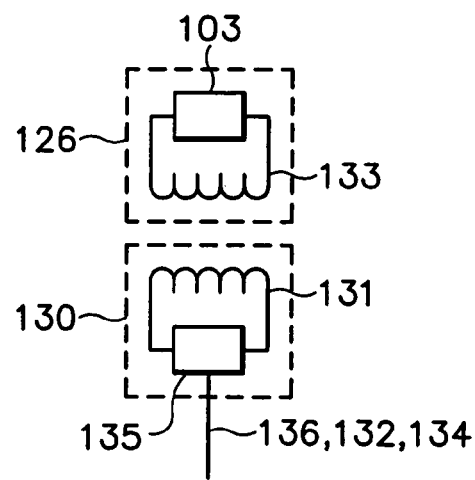

FIGS. 7A and 7B show a device charger 130 that operates by inductively coupling an internal transformer windings 131 to a mating inductive winding 133 in the battery-charging module 126 of locator device 10. The device charger 130 can also include an RF modem 138 that communicates with the RF modem 122 in locator device 10 (FIG. 6C).

In one embodiment, a Universal Serial Bus (USB) connector 132 is coupled to the RF modem 138 and provides power to a transformer circuit 135 for supplying power to the internal transformer windings 131. The USB connector 132 also exchanges position and other data through the RF modem 138 to the locator device 10. The USB connector 132 is coupled to either the GPS system 16 (FIG. 1) in vehicle 14 or to some other GPS or computer system. In another embodiment, an Alternating Current (AC) plug 134 provides 120 volt AC power to the transformer 135 in charger 130. In yet another embodiment, a 12 volt vehicle adapter 136 connects power from a vehicle car battery and/or car alternator to the device charger 130.

Figure 8:
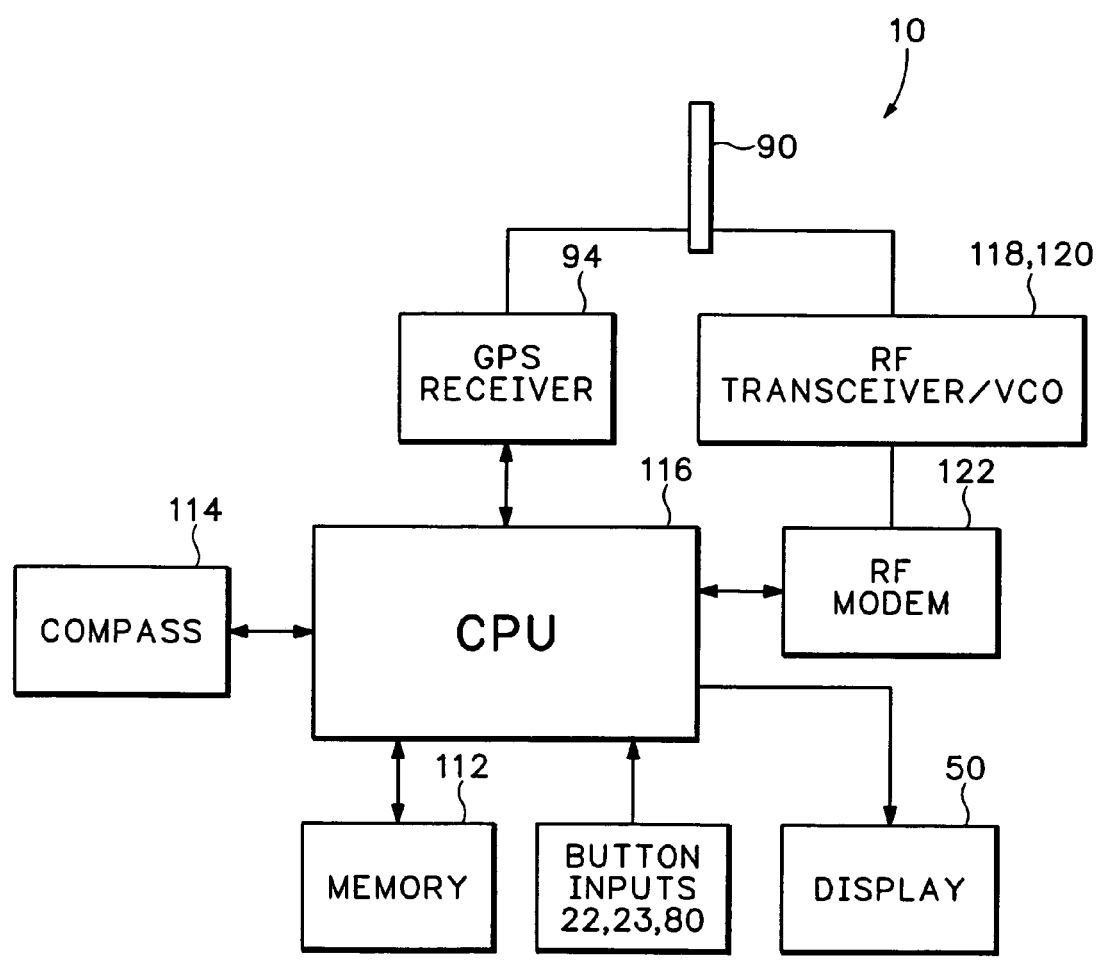
FIG. 8 is a block diagram showing the functional elements inside the locator device.

FIG. 8 is a logical block diagram showing how the different functional blocks in the locator device 10 operate. The GPS receiver 94 and the RF transceiver 120 are coupled to antenna 90. The CPU 116 receives data from the compass 114, RF modem 120 and GPS receiver 94. The memory 112 is used to store multiple waypoints and whatever information is required to operate the mobile unit 10. The CPU 116 receives operator inputs 22, 23 and 80 and displays outputs on display screen 50.

The VCO 118 keeps the RF modem 122 locked onto the correct frequency and is programmable for different frequencies. The RF modem 122 transmits RF data sent by the CPU 116 or receives RF data received from other wireless equipped control systems either in a vehicle of in another locator or GPS device. The RF modem 122 transmits and receives latitude and longitude waypoint information and keyless vehicle entry commands.

Figure 9:
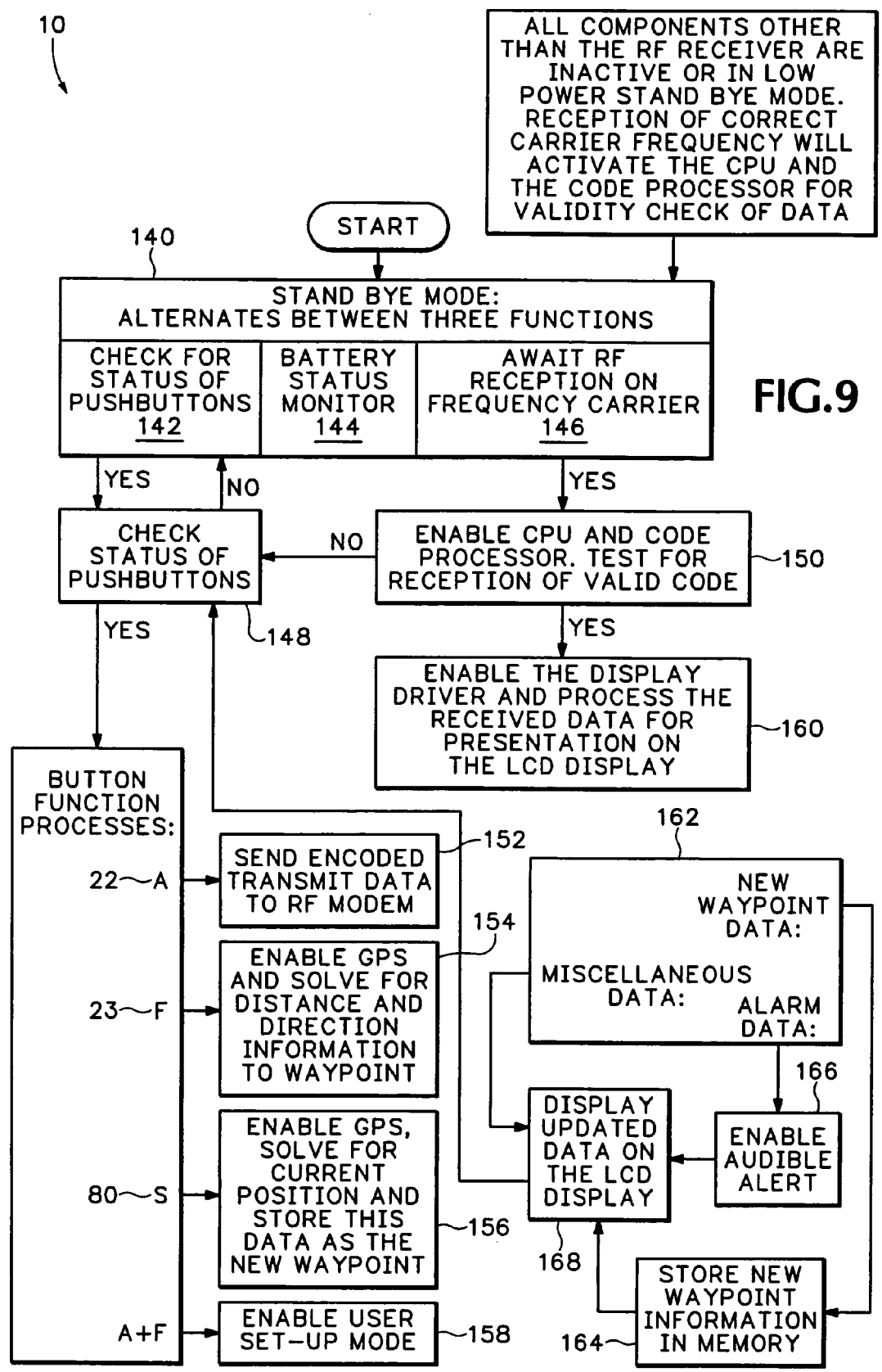
FIG. 9 is a flow diagram showing how the locator device operates.

FIG. 9 is a flow diagram showing how the CPU 116 and other elements in locator device 10 operate. The CPU 116 in block 140 operates in a standby mode and alternates between three different functions. In block 142 the status of the pushbuttons 22, 23 and 80 are constantly checked. In block 144 the status of battery 103 is constantly monitored. In block 146 the RF modem 122 waits for a RF reception on a predetermined carrier frequency. In one embodiment, button activations and alarm indications initiate a piezo crystal buzzer located behind the LCD display 50 for user verification of commands. The same type used in watches etc.

Detecting a depression of the 'S' button 80 in block 156 activates the GPS receiver 94 and automatically sets a 'Waypoint' based on a received GPS longitude and latitude reading. Detecting depression of the 'A' button 22 in block 152 sends encoded transmit data to the RF modem 122. The transmit data can be position data, keyless car lock or unlock data, or security alarm activation/deactivation data. Detecting selection of the 'F' button 23 in block 154 enables the GPS receiver 94 to read a GPS longitude and latitude reading at a current position and then calculate a distance and direction to a saved waypoint.

A locator device operator is only required to press the 'F' button 23 once to determine a direction and distance to a waypoint. A single depression of the 'F' button 23 automatically activates the GPS receiver 94, calculates a current position from the GPS signals received by the GPS receiver 94, derives a distance from the calculated current position to a last programmed waypoint stored in memory, and outputs the distance and direction on the display 50.

The locator device 10 operates as a two-way vehicular keyless entry controller in block 150 when an RF signal is received in block 146 or when the 'A' button 23 is pressed in block 152. A single push of the 'A' button 22 in block 152 initiates an encoded transmission via the RF modem 122 for locking or unlocking a vehicle. The vehicle transmits back RF signals in block 150 that verify the transmitted commands and alarm status. In block 160, the RF data received by the RF modem 122 may cause the CPU 116 to output icons from display 50.

Block 162 identifies some of the data that can be transmitted to the locator device 10 including new waypoint data, alarm data, or miscellaneous data. When new waypoint data is received, block 164 stores the information in memory 112 in the locator device 10 and might display the data on the display 50 in block 168. If alarm data is received in block 166, an audible alert is activated in the locator device 10. Any other miscellaneous data may also be received or displayed on display 50 in block 168.

SETUP MENU

A setup menu is reached in block 158 by pressing, and holding down both the 'A' and 'F' buttons simultaneously until 'SETUP' shows on the display screen 50. The 'A' and 'F' buttons are released and any one of the actions below can be selected. Pressing the 'F' button 23 steps forward to a next menu option. In one example, five setup menus are displayed in the following order on the alphanumeric display 50. A 'STORE' menu is used to store a current waypoint to memory 112. The 'S' button is used to select any one of multiple memory locations. Selecting the 'A' button 22 while in the setup mode accepts and exits the setup mode. Using the 'F' button 23 while in the setup mode steps to a next menu selection.

A menu option 'TX WPT' is used to transmit a current waypoint stored in the locator device 10 to another device. Using the 'A' button activates the RF modem 122 to transmit the TX WPT and then exits the setup mode. This option could be used, for example, if the user of the locator device 10 becomes lost and suspects that there are other locator devices within range.

A menu option 'TXMEM' is used to transmit one of multiple waypoints stored in memory to another device. Pressing the 'S' button 80 scrolls through the memory locations for the different waypoints. Pressing the 'A' button 22 transmits the selected waypoint and then exits the setup mode.

A menu option 'RANGE' is used to display different distance format and pressing the 'S' button steps through the following distance formats.

| FEET | Up to 9,999 Feet-Display shows 'F' |
| --- | --- |
| YARDS | Up to 9,999 Yards-Display shows 'Y' |
| METER | Up to 9,999 Meters-Display shows 'M' |
| KILOMETERS | Up to 9,999 Kilometers-Display shows 'K' |

Pressing the 'A' button accepts a selected format and exits the setup mode. Pressing the 'F' button is used to step to a next menu option. An 'EXIT' menu option exists the setup mode when the 'A' button is pressed.

The system described above can use dedicated processor systems, micro controllers, programmable logic devices, or microprocessors that perform some or all of the mail notification operations. Some of the operations described above may be implemented in software and other operations may be implemented in hardware.

For the sake of convenience, the operations are described as various interconnected functional blocks or distinct software modules. This is not necessary, however, and there may be cases where these functional blocks or modules are equivalently aggregated into a single logic device, program or operation with unclear boundaries. In any event, the functional blocks and software modules or described features can be implemented by themselves, or in combination with other operations in either hardware or software.

Figure 10:
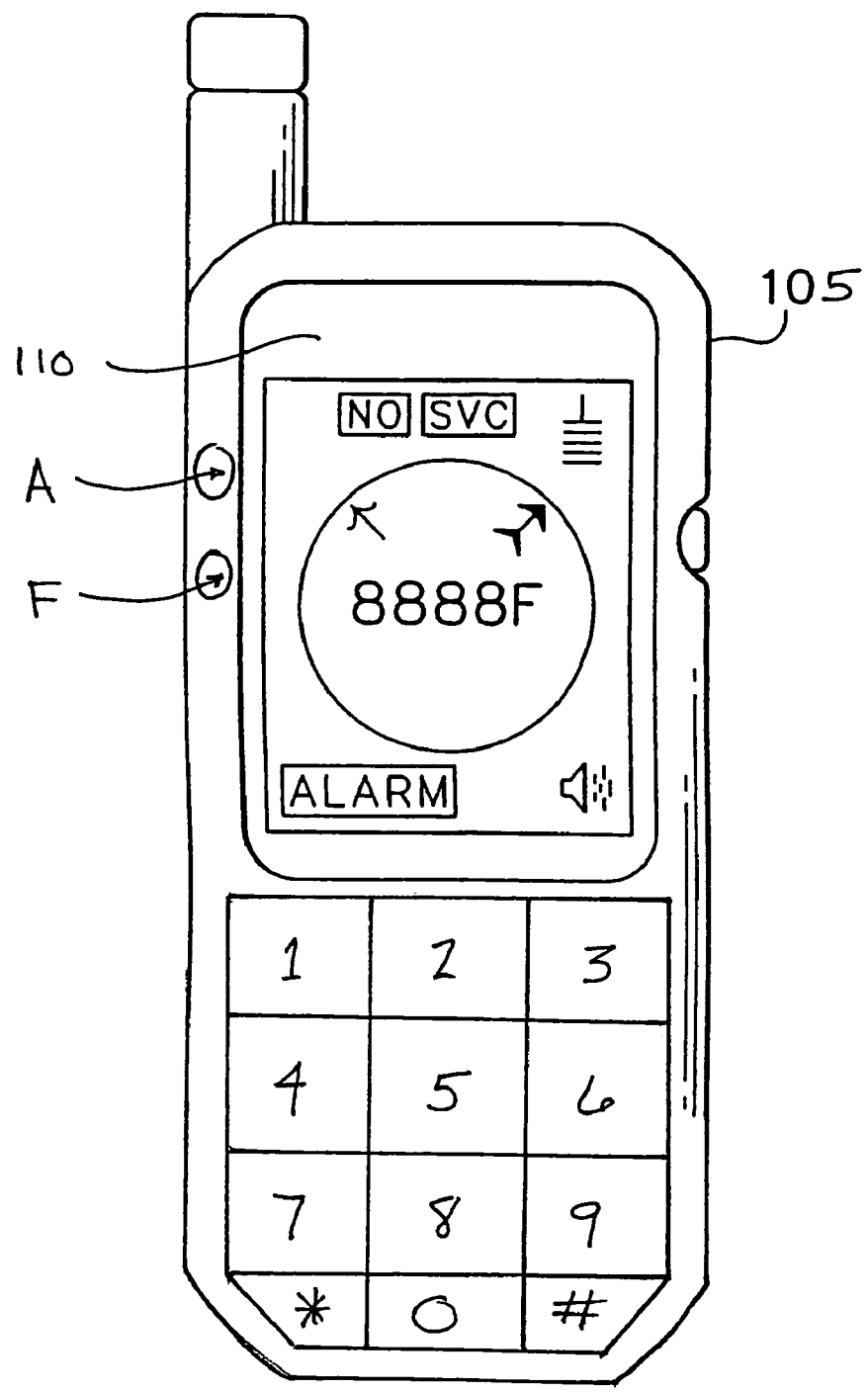
FIG. 10 is a diagram of another locator device according to other embodiments of the invention.

FIG. 10 is a diagram illustrating another locator device 100 according to other embodiments of the invention. The general appearance of the locator device 100 is similar to currently available wireless phones used in the telecommunications industry. For example, the locator device 100 may include a wireless telephone housing 105 that is about 1–1±2 inches wide and around 3–4 inches high. The locator device 100 includes a GPS circuit that is also located inside housing 105. A direction arrow on a Liquid Crystal Display (LCD) 110 points in the direction of the pre-determined waypoint. The LCD 110 also functions as the display screen when the wireless telephone is being used. The locator device 100 also includes an Radio Frequency (RF) modem located inside the housing 105 that provides bi-directional data transfer between other devices. The RF modem may be the same modem that is used when the locator device 100 is functioning as a wireless telephone.

The general population is familiar with and/or use wireless telephones to communicate. By incorporating the locator device 100 within a wireless telephone, an additional remote wireless GPS device does not have to be separately carried by an operator. The locator device 100 may operate in the same manner as the locator device 10 described above, with dedicated function buttons A and F for activating/deactivating a vehicle alarm or for finding a waypoint. Alternatively, rather than using dedicated function buttons A, F as shown in FIG. 10, embodiments of the invention may use the existing keypad buttons or combinations of buttons to activate/deactivate a vehicle alarm or find a waypoint.

Similar to the embodiments described above, these embodiments of the invention may also automatically download a waypoint into the locator device 100 when a triggering event occurs. Like the embodiments described above, the locator device 100 may also manually determine new waypoints by pressing a single button. The operator can determine a direction and distance back to any entered waypoint with one button press. This eliminates the complexity of present GPS systems.

Additionally, because the locator device 100 is incorporated within a wireless telephone, a triggering event could also include, for example, the locator device 100 leaving the proximity of a previously defined home service area, a failure of the wireless telephone to attempt to contact a selected telephone number prior to a selected time, or a failure of the user to answer an incoming telephone call originating from a selected number. Triggering events might also be set to occur periodically, e.g., at the top of every hour, or at particular specified moments in time.

Once the waypoint is downloaded to the locator device 100 after the triggering event, the locator device 100 may command the wireless telephone circuit to communicate with another device and transmit information that identifies the unique locator device 100 and the downloaded waypoint. In this manner, the location of the locator device 100 immediately after the triggering event occurs may be shared with other devices. For instance, other devices may include another locator device 100, a wireless telephone, a wireless LAN, or an access point for a wireless ISP provider.

According to some other embodiments of the invention, the locator device 100, using its internal GPS circuit, may periodically download a waypoint prior to the time that the triggering event occurs. Once the triggering event occurs, the locator device 100 may command the wireless telephone circuit to communicate with another device and transmit information to that device that identifies the unique locator device 100 and the last known waypoint for the locator device. Alternatively, the locator device 100 may use memory to store a series of waypoints that was downloaded prior to the triggering event, subsequently transmitting the entire series of stored waypoints after the triggering event occurs. Thus, the "trail" of the locator device 100 prior to the triggering event may be established.

According to still other embodiments of the invention, the locator device 100, using its internal GPS circuit, may periodically download a waypoint after the triggering event occurs. Thus, after the triggering event occurs, the locator device 100 periodically commands the wireless telephone circuit to communicate with another device and transmit information to that device that identifies the unique locator device 100 and the current waypoint for the locator device. Alternatively, the locator device 100 may use memory to store a series of waypoints that was downloaded after the triggering event, and then transmit the entire series of waypoints during one communication. Thus, the "trail" of the locator device 100 after the triggering event may be established.

One problem that exists regarding conventional locator devices is that if the locator device is damaged or otherwise rendered non-functional then it is unable to transmit signals after a triggering event (such as a car wreck, being dropped in the water, being turned off, being intentionally destroyed). However, according to some embodiments of the invention, waypoints may also be automatically and periodically sent to other devices prior to any triggering event. Thus, the waypoints for a particular locator device 100 may still be retrieved if the locator device fails to contact another device within a period of time.

Alternatively, embodiments of the invention may also operate according to a combination of the embodiments described above. For example, a locator device according to other embodiments of the invention may transmit both the waypoints stored before the triggering event and periodically transmit a series of waypoints obtained after the triggering event.

Having described and illustrated the principles of the invention in a preferred embodiment thereof, it should be apparent that the invention may be modified in arrangement and detail without departing from such principles. Claim is made to all modifications and variation coming within the spirit and scope of the following claims.

We claim:

1. A wireless telephone comprising:
   a locator circuit configured to receive a first waypoint after a first triggering event and configured to determine directional information from a current location to the first waypoint, wherein the first waypoint is calculated prior to the first triggering event; and
   a display for showing the directional information.

2. The wireless telephone of claim 1, further comprising a remote keyless vehicle entry circuit for remotely locking and unlocking a vehicle.

3. The wireless telephone of claim 1, further configured to transmit the current location to a wireless device after a second triggering event.

4. The wireless telephone of claim 3, further configured to transmit a second waypoint to a wireless device after the second triggering event, the second waypoint representing a past location of the wireless telephone.

5. The wireless telephone of claim 1, the locator circuit comprising a Global Positioning System (GPS) receiver for receiving GPS location data from GPS satellites and a wireless modem that receives GPS location data from other GPS receivers.

6. The wireless telephone of claim 5, the wireless modem configured to receive a vehicle location transmitted by another GPS system.

7. The wireless telephone of claim 6, the locator circuit configured to store the vehicle location as the first waypoint.

8. The wireless telephone of claim 1, further comprising an electronic compass circuit for showing the directional information in relation to compass directions output by the electronic compass circuit.

9. The wireless telephone of claim 1, the display configured to indicate both a direction from the current position to the first waypoint and a distance from the current position to the first waypoint.

10. The wireless telephone of claim 1, further comprising a first button that when depressed initiates the locator circuit to acquire satellite GPS location data, derive the current location from the GPS location data, calculate a heading and distance to the first waypoint, and output the heading and distance on the display.

11. The wireless telephone of claim 10, further comprising a second button that when depressed initiates the locator circuit to turn on, acquire available GPS satellite information, derive the current position and store the current position in a memory as the first waypoint.

12. The wireless telephone of claim 1., further comprising a memory for storing multiple waypoints, the locator circuit identifying a direction and distance from the current position to any one of the stored multiple waypoints.

13. The wireless telephone of claim 1, further comprising a transceiver for exchanging vehicle security commands with a vehicle security system and for exchanging GPS data with other locator circuits.

14. A locator device, comprising:
    a pocket-sized casing;
    a GPS receiver circuit located inside the casing and configured to identify a first location of the locator device;
    a memory configured to store a second location of the locator device;
    a processor configured to derive a direction and distance from the first location to the second location: and
    a transceiver located inside the casing and configured to wirelessly transmit the first location and an identifier to another device after a triggering event occurs.

15. The locator device of claim 14, the transceiver further configured to transmit the second location to the another device after the triggering event occurs.

16. The locator device of claim 14, the GPS receiver configured to automatically find a third location of the locator device after a period of time, the transceiver configured to automatically transmit the second location to the another device alter the period of time, and the memory configured to store the first location.

17. The locator device of claim 14, the another device selected from the group consisting of another locator device, a wireless telephone, a wireless LAN, or an access point for a wireless ISP provider.

18. A method comprising:
   storing a first GPS waypoint in a handheld locator device;
   identifying when a triggering event occurs;
   transmitting the first GPS waypoint to another device after the triggering event;
   storing a second GPS waypoint in the handheld locator device; and
   identifying a target direction from the second GPS waypoint to the first GPS waypoint.

19. The method of claim 18, further comprising integrating the locator device in a wireless telephone that also contains a screen for displaying the target direction and an RF modem for remotely controlling a vehicle security system.

20. The method of claim 18, further comprising transmitting the second GPS waypoint to the another device after the triggering event.

* * * * *